3,279,869
CLAMP ASSEMBLY FOR A HARROW TOOTH
Anders Andersen, Godthaab, Denmark, assignor to
A/S A. Andersens Staalvarefabrik, Godthaab, Denmark
Filed Apr. 21, 1964, Ser. No. 361,488
Claims priority, application Denmark, May 15, 1963,
2,285
5 Claims. (Cl. 306—1.6)

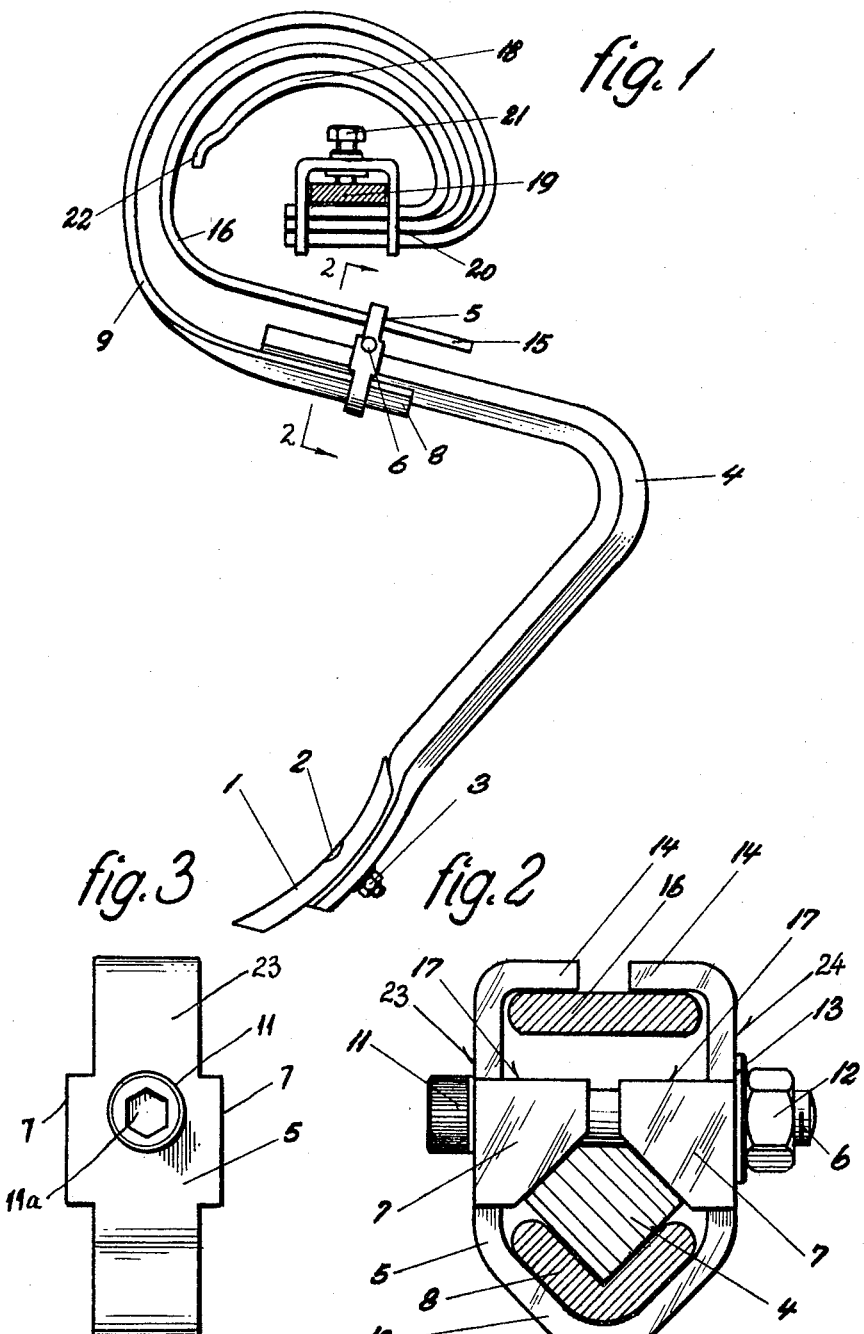

The present invention relates to a novel and useful clamp assembly for a resilient harrow tooth, including in combination a rigid soil working member having a pair of oppositely inclined upper surfaces, a resilient support for said soil working member, and a clamp for clamping the soil working member and the resilient support together.

It is the object of the present invention to provide a clamp assembly which will afford the rigid attachment of spring component of a harrow tooth to the rigid part of the tooth by means of very slight bolt tension, and which includes a clamp that may be forged from a single piece of material.

Self-tightening eccentric mechanisms have formerly been used for similar purposes. However, for use in agricultural implements exposed to all kinds of weather and subject to soilage by earth, such type of tightening mechanism, the action of which depends on the free movement of an eccentric roller around an eccentric axle, has proved to be unreliable.

An essential feature of the clamp assembly of the present invention resides in the fact that a clamping bolt or bolts exert force upon two lateral side surfaces on walls of a clamp disposed at right angles to the axis of said bolt or bolts, with oblique clamping surfaces engaging and pressing upon corresponding oblique surfaces of the harrow tooth. These oblique clamping surfaces are constituted by edges of two or more clamping flaps or lugs integral with the side surfaces of said clamp and bent inwardly therefrom. The lugs have upper surfaces substantially parallel to the bolt or bolts. The side walls of the clamp are connected by a strap or stirrup arranged to provide firm clamping force against those tooth components positioned between the clamping lugs and said strap. By such arrangement, a rigid and secure clamping action is obtained without damage or excessive strain on the structure. A very noticeable increase in clamping pressure is achieved through the inter-action between the oblique clamping surfaces and the clamping bolt, namely by a factor of the versed sine of the angle between the inclined clamping surfaces and a line perpendicular to the plane of the tooth. In addition, the bolts positioned transversely to the plane of the tooth will not be subject to bending through deflection of the resilient tooth, as is usually the case when the clamping bolt passes through the tooth and lies in the plane thereof.

Preferably the clamp is so designed that the portions of the side walls at its open end have extensions in the form of inwardly-bent guiding flanges. Thus, it is possible, without inserting any loose parts into the clamp, to utilize the latter as a guide for an auxiliary spring constituting a part of the spring component of the tooth assembly. This auxiliary spring, in order to provide proper biasing action, should be guided only within the clamp and not secured to the clamp.

Additional objects and advantages of the invention will become apparent during the course of the following specification when taken in connection with the accompanying drawings illustrating an embidiment of a clamp assembly made in accordance with the invention, and in which:

FIG. 1 is a side elevational view of a harrow tooth incorporating a clamp in accordance with the invention;

FIG. 2 is an enlarged section taken along line 2–2 of FIG. 1; and

FIG. 3 is an enlarged side elevational view of the clamp shown in FIG. 1.

Referring in detail to the drawings, FIG. 1 shows a harrow tooth point which is drop-forged into curved V-shape in cross section and which is secured by means of a countersunk bolt 2 and corresponding nut 3 to a rigid and sturdy tooth component 4. The tooth component 4 forms the rigid portion of the harrow tooth and is made of spring steel of square cross section. At its lower or free end, the rigid tooth component 4 is forged to a shape and dimension corresponding to that of the tooth point 1, so that the outer surface of the latter is flush with the forward surface of the rigid tooth component 4. The tooth component 4 and the tooth point 1 together constitute the soil-working means of the harrow tooth assembly.

At the upper portion of the rigid tooth component 4, a strap or clamp 5 is connected by means of a clamping bolt 6 which is seated in a semi-circular notch in the surface of the tooth component 4, as indicated in FIG. 2. The tooth component 4 is further secured to strap 5 by means of two pairs of inwardly directed clamping lugs 7 integral with strap 5 and directed inwardly thereof in such a manner that their narrow edges press obliquely inwardly against the inclined upper edges of the tooth component 4 in the manner shown in FIG. 2. FIG. 3 shows the two spaced lugs 7 at the opposite sides of one of the lateral side surfaces or walls 23 of the substantially U-shaped clamp 5. Thus, there are two pairs of lugs 7 on each of the lateral surfaces or side walls 23 and 24 of the clamp 5, with the lugs 7 facing inwardly towards each other. The lugs of each pair are spaced from each other so that the clamping bolt 6 extends freely between the lugs and is not attached thereto.

The clamp or strap 5 is used to mount the tooth component 4 on a leaf spring 9, an auxiliary, second leaf spring 16, and a third leaf spring 18 (second auxiliary spring), as shown in FIG. 1. The main leaf spring 9 has a free forward end portion 8 which is forged in the form of a V-shaped cross section. The lower end of clamp 5 is formed as a generally V-shaped stirrup 10, that serves as a transverse connecting member between the walls 23 and 24 and which receives and acts as a seat for the V-shaped end portion 8 of main leaf spring 9, as shown in FIG. 2. The inclined or bevelled lower surfaces of the tooth component 4 are supported within the V-shaped configuration of the forward portion 8 of main leaf spring 9.

The clamping bolt 6 has a threaded shaft made of hardened steel of great tensile strength and is provided with a hexagonal socket 11a in a knurled head 11. At its opposite end, the bolt 6 is tightly secured by means of a nut 12 overlying a washer 18. The bolt head 11 is tightened against one planar side surface 23 of the clamp 5, while the nut 12 through washer 13 is tightened to press inwardly against the opposite planar side surface 24 of clamp 5.

At its upper open end, the clamp 5 is formed with a pair of inwardly-bent guiding flanges 14 which loosely enclose a lower end portion 15 of the second leaf spring 16. When no load is exerted against the harrow tooth, the flat spring portion 15 rests against the lower or inner surfaces of the guiding flanges 14 in the manner shown in FIG. 2. On the other hand, when the harrow tooth is under heavy load, the end portion 15 of leaf spring 16 will move through clamp 5 and come to rest upon the upper surfaces of the clamping lugs 7, which are formed as resting surfaces 17.

The upper end portions of leaf springs 9 and 16, together with the corresponding portion of the third leaf spring 18, are clamped to a cross-bar 19 of a harrow chassis (not shown), by means of a clamp 20 and bolt 21.

At its free end, the third leaf spring 18 has a forged protrusion 22 which faces the second leaf spring 16 which is located forwardly of said protrusion. When the harrow tooth is in unloaded condition, the protrusion 22 is spaced from the spring 16, as shown in FIG. 1. When the harrow tooth is heavily loaded, i.e. when the load thereon is increased beyond the point at which the second leaf spring portion 15 bears against the resting surfaces 17 of clamp lugs 7, the rear surface of spring 16 will be moved into engagement with the protrusion 22 of the third leaf spring 18. The third leaf spring 18 will thus contribute to the support of the harrow tooth, and will serve as a second auxiliary leaf spring for this purpose.

In assembling the harrow tooth, the bolt 6 and nut 12 are tightened, causing the clamping lugs 7 to press inwardly against the opposed inclined surfaces of the rigid tooth component 4. Thus, the rigid tooth component 4 is clamped against the main leaf spring 9 by means of clamp 5. When the nut 12 is tightened on the bolt 6, it turns the side walls or arms 23 and 24 of the clamp toward each other so that the two pairs of spaced lugs 7 engage the portion of the harrow tooth which is to be clamped and exert a resulting force in the direction of the arrows shown in FIG. 2. This presses the harrow tooth portion 4 vertically downward into engagement with the spring support 8.

The gripping of the rigid tooth component 4 is further assisted by the sliding action which occurs between the lugs 7 and said component 4, during tightening of bolt 6. Such sliding action provides a frictional engagement of the metallic parts in a direction transverse to the direction of the clamping forces, which clamping forces use of the tooth, would tend to shift the rigid tooth component 4 within the clamp.

Because of this gripping action, it is possible with little effort to secure the rigid portion of the tooth reliably by the use of ordinary tools. The aforementioned semi-circular notch at the rear or upper surface of the tooth component 4 merely serves to insure correct assembly of the parts, and not as a medium for the transmission of forces.

While a preferred embodiment of the invention has been shown and described herein, it is obvious that numerous omissions, changes and omissions may be made in such embodiment without departing from the spirit and scope of the invention as defined in the appended claims.

What I claim is:

1. A clamp assembly for a resilient harrow tooth, including in combination a rigid soil working member having a pair of oppositely inclined upper surfaces, a reslient support for said soil working member including at least one spring member, and a clamp comprising a pair of spaced opposed arms connected together at one end by a transverse member, a clamping member integral with each of said arms above said transverse member and movable with the corresponding arm, said clamping members extending inwardly toward each other and having complementarily formed inclined clamping surfaces positioned to overlie and make flush engagement with the respective inclined upper surfaces of said soil working member, said clamp being sized and positioned to received said spring member therein in abutment with said transverse member, and at least one clamping bolt extending transversely through and between said arms and free from engagement with said clamping members, said bolt being adjustable for drawing said opposed arms toward each other, whereby said clamping members are urged toward each other to exert a pressing force against said soil working member in a direction substantially perpendicular to the axis of said bolt and toward said spring member, whereby to clamp said spring member between the soil working member and said transverse member.

2. A clamp assembly according to claim 1 in which a pair of aligned, spaced clamping members extend from opposite sides of each of said clamp arms, each of said clamping members comprising a rigid lug formed integrally with one of said arms and directed inwardly therefrom substantially normal to the axis of said one arm, said clamp being integrally formed from a single piece of material.

3. A clamp assembly to claim 1 wherein said spring member is of substantial V-shape, and in which said soil working member has lower surfaces corresponding to the upper surfaces of said spring member and the transverse member of said clamp has an upper surface complementary to and shaped to provide a seat for the lower surfaces of said spring member.

4. A clamp assembly according to claim 1 in which said resilient support includes a second spring member, and each of said clamp arms has an inturned terminal flange at its free end, said flanges extending toward each other and being spaced above said clamping members, said second spring member extending freely between said clamp arms and normally abutting said flanges, and bearing surfaces on said clamping members for engaging said second spring member when the soil working member has moved a selected distance relative to said second spring member.

5. A clamp assembly according to claim 1 in which said soil working member is provided with a notch for receiving said clamping bolt therein.

References Cited by the Examiner

UNITED STATES PATENTS

| 2,205,474 | 6/1940 | Goeller | 24—125 |
| 2,584,614 | 2/1952 | Rasmussen et al. | 306—1.5 |
| 2,909,381 | 10/1959 | Bates | 24—125 X |

FOREIGN PATENTS

| 1,323,486 | 2/1963 | France. |
| 646,020 | 6/1937 | Germany. |
| 662,642 | 7/1938 | Germany. |
| 797,355 | 7/1958 | Great Britain. |

WILLIAM FELDMAN, *Primary Examiner.*

E. SIMONSEN, *Assistant Examiner.*